No Printed Specification Available
7652X
N. C. Staples,
Hoisting Bucket.
Patented June 29, 1833.
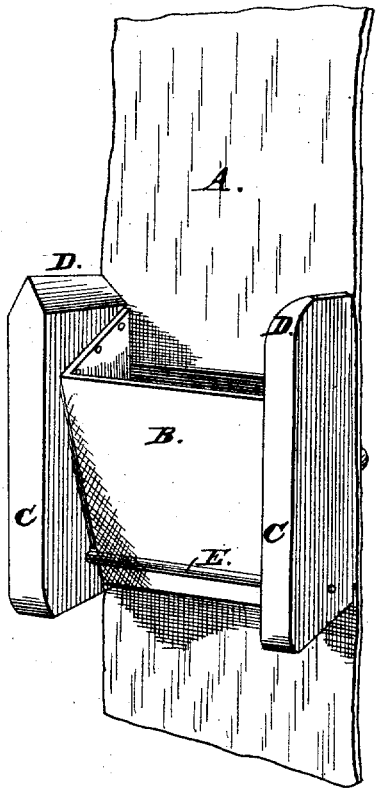
AM. PHOTO-LITHO. CO. N.Y. (OSBORNE'S PROCESS)

June 29, 1833

7652X Nelson C. Staples

Letters Patent.

The Schedule referred to in these Letters Patent and making part of the same, containing a description in the words of the said Nelson C. Staples, himself of his improvement in the Elevator, Bucket.

Be it known, that I Nelson C. Staples of Lynchburgh in the County of Campbell, & State of Virginia have made a new and useful improvement in the elevator buckets which is described as follows; reference being had to the annexed drawing. The strap or band A to which the bucket B is fastened, is made in the usual manner. My improvement consists in having two blocks of wood c.c, each a little larger than the end of the bucket, and about an inch thick, fastened to the ends of the bucket, the edges of which projecting a little beyond the front edge of the bucket to prevent it touching the trough, the upper ends of the blocks being bevelled off as represented at D, in the drawing. A iron rod E extending across the front of the bucket, and passing thro' the blocks is riveted on the outside of the same at each end. The bucket is attached to the strap or band by two strong screws or passing thro' the strap and the turned over edges of the bucket into the back edges of the blocks.

In Testimony whereof I have hereunto subscribed my name before two Witnesses this twentieth day of June 1833. [illegible] N.C.

Nelson C. Staples

Witnesses
William P. Elliot
David C. Bishop ([illegible])

(Patented June 29, 1833)

[illegible]